US007715626B2

(12) United States Patent
Florin et al.

(10) Patent No.: US 7,715,626 B2
(45) Date of Patent: May 11, 2010

(54) SYSTEM AND METHOD FOR VASCULAR SEGMENTATION BY MONTE-CARLO SAMPLING

(75) Inventors: Charles Florin, Princeton, NJ (US); James P. Williams, Princeton Junction, NJ (US); Nikolaos Paragios, Vincennes (FR)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1087 days.

(21) Appl. No.: 11/384,894

(22) Filed: Mar. 20, 2006

(65) Prior Publication Data
US 2006/0239541 A1 Oct. 26, 2006

Related U.S. Application Data

(60) Provisional application No. 60/664,627, filed on Mar. 23, 2005.

(51) Int. Cl.
*G06K 9/34* (2006.01)
(52) U.S. Cl. .................. 382/173; 382/154; 382/131; 382/132
(58) Field of Classification Search ............ 382/173, 382/154, 131, 132; 345/419, 173
See application file for complete search history.

(56) References Cited

U.S. PATENT DOCUMENTS

| 5,926,568 | A * | 7/1999 | Chaney et al. | 382/217 |
|---|---|---|---|---|
| 5,995,644 | A * | 11/1999 | Lai et al. | 382/131 |
| 6,188,776 | B1 * | 2/2001 | Covell et al. | 382/100 |
| 6,671,661 | B1 * | 12/2003 | Bishop | 703/2 |
| 6,690,816 | B2 * | 2/2004 | Aylward et al. | 382/128 |
| 7,313,269 | B2 * | 12/2007 | Xie et al. | 382/159 |
| 7,379,844 | B2 * | 5/2008 | Lee et al. | 702/181 |
| 7,391,882 | B2 * | 6/2008 | Paragyios | 382/103 |
| 2005/0249391 | A1 * | 11/2005 | Kimmel et al. | 382/128 |
| 2006/0050958 | A1 * | 3/2006 | Okada et al. | 382/173 |
| 2006/0188139 | A1 * | 8/2006 | Khamene et al. | 382/130 |

OTHER PUBLICATIONS

Matthias MÜhlich(hereafter Matthias), Filter-Workshop on "Particle Filters an overview",<http://user.unifrankfurt.de/~muehlich/sci/TalkBucurestiMar2003.pdf>, published on Mar. 2003, p. 1-45.*
On sequential Monte Carlo sampling methods for Bayesian filtering, Statistics and Computing published on 2000, pp. 197-208.*

(Continued)

*Primary Examiner*—Brian Q Le
*Assistant Examiner*—Mekonen Bekele
(74) *Attorney, Agent, or Firm*—Donald B. Paschburg; F. Chau & Associates, LLC

(57) ABSTRACT

A method of segmenting tubular structures in digital images includes selecting a point in an image of a tubular object to be segmented, defining an initial state of the selected point, initializing measurement weights, a conditional probability distribution and a prior probability distribution of a feature space of the initial state, sampling the feature space from the prior probability distribution, estimating a posterior probability distribution by summing sample measurements weighted by the measurement weights, and segmenting a cross section of the tubular object from the posterior probability distribution.

23 Claims, 9 Drawing Sheets

OTHER PUBLICATIONS

Real time hand tracking by combining Particle Filtering and Mean shift, IEEE International Conference on Automatic Face and Gesture Recognition, published on 2004, pp. 1-6.*

Image segmentation by data -deiven Markov Chain Monte Carlo, Transactions on pattern Analysis and Machine Inelegancy, vol. 24, No. 5, Mat 2002, pp. 657-673.*

Matthias MOhlich Filter-Workshop on Particle Filters an verview, http://user.unifrankfurt.de/~muehfich/sci/TalkBucurestiMar2OO3.pdf> published on Mar. 2003, p. 1-45.*

Florin, Charles; Paragios, Nikos; Williams, Jim: ""Monte Carlo Sampling, Particle Filters and Segmentation of Coronaries"" Research Report 05—03—CERTIS—ENPC, Jan. 2005, XP002399678 Maine la Vallee, France Section 2.4—"Prediction and Observation: Distance" abstract Section 3 "Particle Filters" and subsections Section 4—"Particle Filters & Vessel Tracking" and subsections Section 5—"Discussion".

Cootes T F et al: "Active appearance models" European Conference on Computer Vision, Berlin, DE, vol. 2, 1998, pp. 484-499, XP002257477 abstract Section 2—"Modelling Appearance" and subsections.

Sanjeev Arulampalam M et al: "A Tutorial on Particle Filters for Online Nonlinear/Non—Gaussian Bayesian Tracking" IEEE Transactions on Signal Processing, IEEE Service Center, New York, NY, US, vol. 50, No. 2, Feb. 2002, XPO1 1059526 ISSN: 1053—587X Section V—"Particle Filtering Methods" and subsections, in particular A.3)—"Resampling".

De Bruijne M et al: "Image segmentation by shape particle filtering" Pattern Recognition, 2004. ICPR 2004. Proceedings of the 17th International Conference on Cambridge, UK Aug. 23-26, 2004, Piscataway, NJ, USA,IEEE, vol. 3, Aug. 23, 2004, pp. 722-725, XP010724762 ISBN: 0—7695—2128—2 the whole document.

* cited by examiner

| Vessel Name | % Segmented |
|---|---|
| RCA | 100% |
| Acute Marginal | 90% |
| LAD | 100% |
| First Septal | 94% |
| LCX | 100% |
| Obtuse Marginal | 94% |

FIG. 5

SYSTEM AND METHOD FOR VASCULAR SEGMENTATION BY MONTE-CARLO SAMPLING

CROSS REFERENCE TO RELATED UNITED STATES APPLICATION

This application claims priority from "Vascular Segmentation by Monte-Carlo Sampling, with Prior Appearance Model", U.S. Provisional Application No. 60/664,627 of Florin, et al., filed Mar. 23, 2005, the contents of which are incorporated herein by reference,

TECHNICAL FIELD

This invention is directed to the segmentation of tubular structures in medical imaging and computer vision applications.

DISCUSSION OF THE RELATED ART

Quasi-Monte-Carlo methods are a dynamic field of study for Computer Vision, due to the increasing capacities of computers. Furthermore, for a class of segmentation problems for which ground-truth is widely available, statistical learning leads to faster and more robust results.

Segmentation of tubular structures arises in numerous applications of computer vision. Medical imaging is an example where such need exists, in particular in vascular and retinal images. The coronary arteries play a major role in the proper functioning of the heart. The segmentation of coronaries is a powerful diagnostic tool to assist physicians. Such a tool provides indications on general morphology, stenosis and aneurysms, the most important coronary arteries pathologies.

Vessel enhancement either through local analysis of the feature space or through differential geometry-based methods can be considered low-level segmentation techniques. Skeleton-based techniques aim at extracting vessel centrelines that, when connected, lead to a complete reconstruction of the vessel tree. Region growing approaches progressively segment pixels with similar intensity properties toward complete reconstruction of the vessels, while local morphological filter operators aim at smoothing and completing the vessel structure, providing a valuable alternative to explicit vessel segmentation.

Deformable models have also been considered to recover vessel structures either in a parametric or geometric form. To this end, level set methods have been considered to address segmentation of non-linear structures, for example, the optimization of a co-dimension two active contour for segmenting brain vessels. Template matching techniques have also been investigated for accounting for prior knowledge on the appearance of vessels, as well as generalized cylindrical models to recover vessels in angiograms.

Tracking approaches are based on the application of local operators to track the vessel. Given a starting condition such methods recover the vessel centerline through processing information on the orthogonal plane to the vessel. Various forms of edge-driven techniques, similarity/matching terms between the vessel profile in successive planes, as well as their combination have been considered to perform tracking.

One can claim that existing approaches suffer from certain limitations. Local operators, region growing techniques, morphological filters as well as geometric contours can be very sensitive to local minima and fail to take into account prior knowledge on the form of the vessel. On the other hand, cylindrical models, parametric active contours and template matching techniques might not be well suited to account for the non-linearity of the vessel structure and require particular handling of branchings and bifurcations. Tracking methods can often fail in the presence of missing and corrupted data.

Prior art related to the segmentation of coronaries is mostly recent, due to the relatively new imaging equipment required to consistently image the heart at sufficient resolution. Multi-scale vessel enhancement algorithms have been utilized to handle complicated vessel measures. Non-linear level set methods have been considered to address vessel segmentation. For example, a local shape term that constrains the diameter of the vessel and discourages leaking was proposed while a different concept, the maximization of flux was introduced and exploited for vessel segmentation using vessel measures.

SUMMARY OF THE INVENTION

Exemplary embodiments of the invention as described herein generally include methods and systems for particle-based approaches to vessel segmentation. According to an embodiment of the invention, successive planes of the vessel are modeled as states of a Particle Filter. Such states include the position, orientation and geometric form of the vessel. In order to account for bifurcations and branchings, a Monte Carlo sampling rule known as a Particle Filter is considered that propagates in parallel multiple hypotheses. Prior knowledge on the vessel appearance and local structure space is accounted for through a learning stage. To this end, a linear kernel that creates certain invariance on the vessel intensities space is considered and a principal component analysis on this space is used to determine an appropriate PDF. Parallel to that, the local structure of the vessel, i.e. the relative change on the orientation of the vessel's centerline, is modeled through a parametric density function that is used, to some extent, to guide the re-sampling process on the particles. An approach according to an embodiment of the invention combines a statistical model and image-based metrics, accounts for the structural and appearance non-linearity of the vessel through the maintenance of multiple hypotheses, and can address pathological cases. The final paradigm includes a multiple hypothesis propagation technique where the vessel structure as well as its appearance are successfully recovered.

The use of an image term and a statistical model makes the probability measure both robust to pathologies and yet, drives the segmentation toward the most probable solution given the statistical prior. Also, learning the variation laws that rule the feature space allows for the reduction in the number of particles, and the controlled process noise that comes from prior knowledge and that is introduced in the resampling stage overcomes the issue of samples impoverishment.

The final result of Particle Filtering is a probability density function (pdf) in the feature space that describes the vessel (location, orientation and appearance) along its centerline. The final segmentation result exploits this pdf to obtain the successive states of the vessel along the centerline. This can be achieved in numerous ways, such as, for example, a maximum likelihood method, which takes the most likely hypothesis at each time step, or a weighted averaging method, which takes the weighted mean of all the hypothesis at each time step.

According to an aspect of the invention, there is provided a method for segmenting tubular structures in digital images, including providing a digitized image comprising a plurality of intensities corresponding to a domain of points on a 3-dimensional grid, selecting a point within a tubular object in said image, wherein said object is to be segmented, defining an initial state of said selected point of said object, initializing measurement weights, a conditional probability distribution and a prior probability distribution of a feature space of said initial state, sampling said feature space from said prior probability distribution, estimating a posterior probability distribution by summing sample measurements weighted by said measurement weights, and segmenting a cross section of said tubular object from said posterior probability distribution.

According to a further aspect of the invention, the method includes providing a training set of tubular cross sections, and performing a principle component analysis on the cross sections of said training set to determine a representation of said tubular cross section.

According to a further aspect of the invention, the initial state comprises an object center position, an object orientation, and an object cross section model.

According to a further aspect of the invention, estimating said posterior probability distribution $p(x_t|z_{1:t})$ comprises computing $$p(x_t | z_{1:t}) \approx \sum_{m=1}^{M} w_t^m \delta(x_t - x_t^m),$$

wherein M is the number of samples, $w_t^m$ represents the weight for each sample at time step t, $x_t^m$ represents the sample measurements at time t, and $\delta$ is the Dirac delta function.

According to a further aspect of the invention, the method includes updating said measurement weights, wherein $w_t^m \propto w_{t-1}^m p(z_t|x_t^m)$, $w_t^m$ represents the weight for each sample at time step t, $z_t$ represents an observation of said state at time t, $x_t^m$ represents the sample measurements at time t, and $p(z_t|x_t^m)$ is the conditional probability.

According to a further aspect of the invention, the training set comprises a set of 2D cross sectional images, and performing a principle component analysis on said training set cross sections comprises estimating a mean of said training set and subtracting said mean to obtain a set of zero-mean cross sectional images, forming a covariance matrix from said set of zero-mean cross sectional images, performing a singular value decomposition $UDV^T$ of said covariance matrix, wherein a model zero-mean cross section is obtained summing those eigenmodes representing a predetermined percentage of the variation in said set of cross sections.

According to a further aspect of the invention, a conditional probability distribution for appearance is proportional to exp $(-D/D_0)$, wherein D is a distance between said model cross section and a normalized sample cross section that comprises $$\sum_k \frac{|b_k|}{\sqrt{\lambda_k}},$$

$D_0$ is an application specific normalization constant, k is summed over representative eigenmodes, $b_k$ is the variation for each mode, and $\lambda_k$ is the eigenvalue for each eigenmode.

According to a further aspect of the invention, the object cross section is modeled by an ellipse, wherein said initial conditional probability of said object cross section is proportional to exp$(-R/R_0)$, where R is defined by $$\begin{cases} R = -\infty, & \mu_{int} \leq \mu_{ext}, \\ R = \frac{\mu_{int} - \mu_{ext}}{\mu_{int} + \mu_{ext}}, & \text{otherwise,} \end{cases}$$

wherein $R_0$ is an application specific normalization constant, $\mu_{int}$ is the mean intensity value for points in the ellipse, and $\mu_{ext}$ is the mean intensity value for points in a ribbon around the ellipse, wherein the ribbon and the ellipse have the same area.

According to a further aspect of the invention, the method includes resampling said feature space from said posterior probability distribution by adding a random vector to samples selected from the most probable portions of said probability distribution.

According to a further aspect of the invention, the resampling is performed when an effective sampling size $$N_{\mathit{eff}} = \frac{1}{\Sigma_m w_m^2}$$

is less than half of the number of samples, wherein $w_m$ represents the weight for each sample.

According to a further aspect of the invention, the method includes using clustering algorithm to detect a branch in said object.

According to another aspect of the invention, there is provided a program storage device readable by a computer, tangibly embodying a program of instructions executable by the computer to perform the method steps for segmenting tubular structures in digital images.

BRIEF DESCRIPTION OF THE DRAWINGS

FIG. 5 depicts a table of segmentation results of various arteries for 37 patients, according to an embodiment of the invention.

DETAILED DESCRIPTION OF THE PREFERRED EMBODIMENTS

Figure 1:
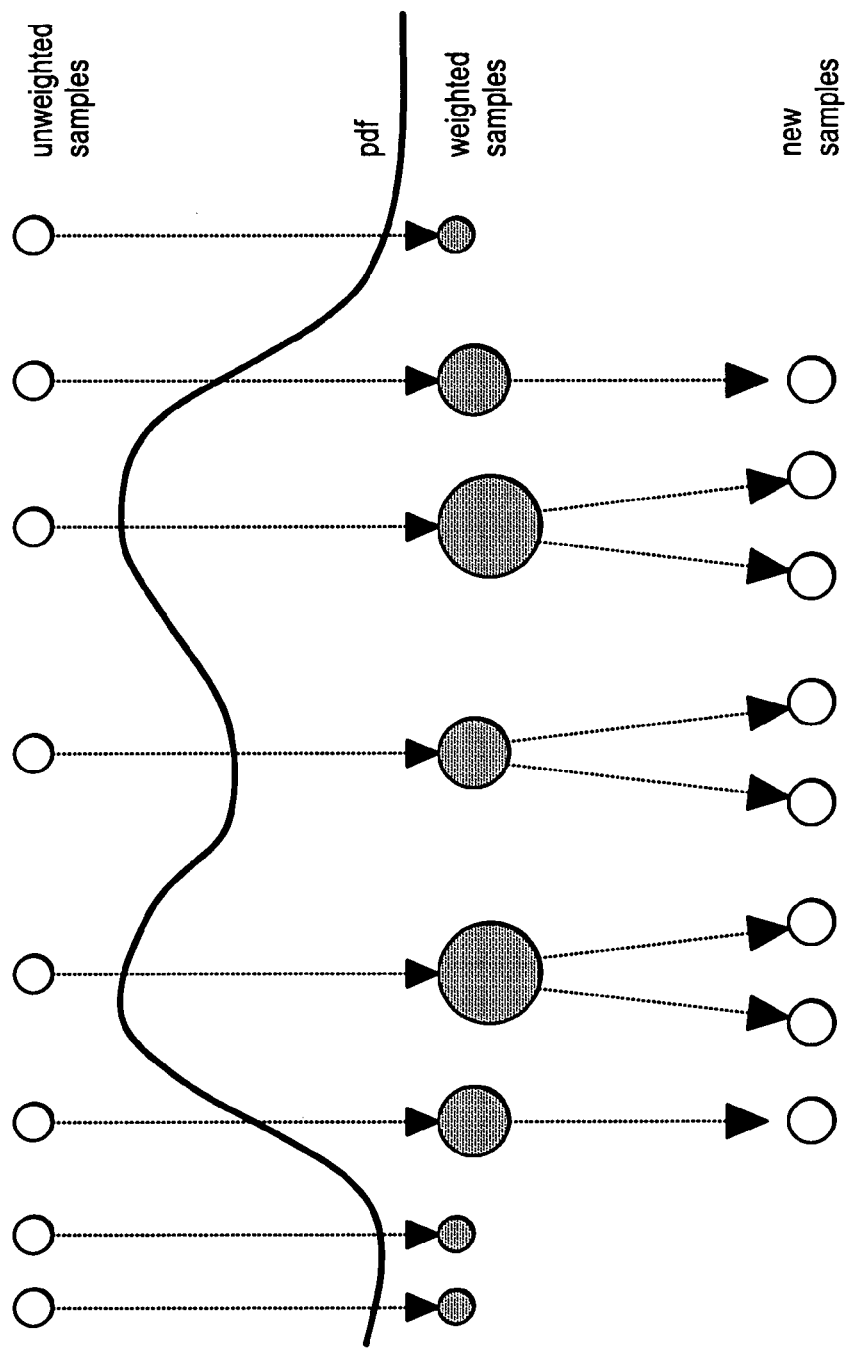
FIG. 1 is a schematic representation of a resampling process that chooses samples with the highest weights on application of a local perturbation, according to an embodiment of the invention.

Exemplary embodiments of the invention as described herein generally include systems and methods for particle-filter based propagation approaches for the segmentation of vascular structures in 3D volumes.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Vessel segmentation can be considered as a tracking of tubular structures in 3D volumes. Thus, given a starting position, the objective is to consider a feature vector that upon its successful propagation can lead to the complete reconstruction of the coronaries. A statistical interpretation of such an objective refers to the introduction of a probability density function (pdf) that uses previous states to predict possible new positions of the vessel, and image features to evaluate the new position.

A Bayesian tracking scheme can be simply formulated as the computation of the present state $x_t$ pdf of a system, conditional to observations $z_{1:t}$ from time 1 to time t: $p(x_t|z_{1:t})$. Assuming that one can have access to the prior pdf $p(x_{t-1}|z_{1:t-1})$, the posterior pdf $p(x_t|z_{1:t})$ can be computed according to the Bayes rule:

$$p(x_t \mid z_{1:t}) = \frac{p(z_t \mid x_t) p(x_t \mid z_{1:t-1})}{p(z_t \mid z_{1:t-1})},$$

where the prior pdf is computed via the Chapman-Kolmogorov equations, $$p(x_t|z_{1:t-1}) = \int p(x_t|x_{t-1}) p(x_{t-1}|z_{1:t-1}) dx_{t-1},$$

and $$p(z_t|z_{1:t-1}) = \int p(z_t|x_t) p(x_t|z_{1:t-1}) dx_t.$$

A recursive computation of the prior and the posterior pdf can lead to the exact computation of the posterior density. Nevertheless, in practical cases, it is impossible to compute exactly the posterior pdf $p(x_t|z_{1:t})$, which must be approximated.

According to an embodiment of the invention, a particle filter can be used to estimate the posterior pdf. To explain the concept of Particle Filters, start with one single hypothesis about the vessel. This hypothesis describes the location, orientation, shape and appearance of the vessel, and a probability function can measure the likelihood of this given hypothesis. If any parameter is modified in this hypothesis, another probability is measured and the best of these two hypothesis can be kept to describe the vessel. The best hypothesis can be iteratively modified to improve the model. Now, instead of one single hypothesis, a collection of hypotheses can be used. Since a probability can be associated to each hypothesis, a probability density function can be drawn over the feature space. The less probable hypothesis can then be iteratively replaced by a more probable, slightly modified, hypothesis. A Particle Filter works in the same manner: each hypothesis is actually a state of the feature space (or particle), and the collection of hypotheses is a sampling of the feature space.

Particle filters are sequential Monte-Carlo techniques that can be used to estimate the Bayesian posterior probability density function (pdf) with a set of samples. In terms of a mathematical formulation, such a method approximates the posterior pdf by M random measures $\{x_t^m : m=1, \ldots, M\}$ associated to M weights $\{w_t^m : m=1, \ldots, M\}$, such that $$p(x_t \mid z_{1:t}) \approx \sum_{m=1}^{M} w_t^m \delta(x_t - x_t^m),$$

where each weight $w_t^m$ reflects the importance of the sample $x_t^m$ in the pdf. This resampling is depicted in FIG. 1, which illustrates how random selection can choose samples with the highest weights where a local perturbation is applied.

The samples $x_t^m$ are drawn according to the principle of Importance Density of pdf $q(.)$. The importance density principle states that $$w_t^m \propto \frac{p(x_{1:t}^m \mid z_{1:t})}{q(x_{1:t}^m \mid z_{1:t})}.$$

This formulation can be derived by assuming the Markovian property for $x_{1:t}$ and for $z_{1:t}$, $$q(x_{1:t}^m \mid z_{1:t}) = q(x_t^m, x_{1:t-1}^m \mid z_t, z_{1:t-1})$$
$$= q(x_t^m \mid x_{1:t-1}^m, z_t) q(x_{1:t-1}^m \mid z_{1:t-1})$$
$$= q(x_t^m \mid x_{t-1}^m, z_t) q(x_{1:t-1} \mid z_{1:t-1}),$$

and, similarly for the pdf, $$p(x_{1:t}^m|z_{1:t}) = p(x_t^m|x_{t-1}^m, z_{1:t}) p(x_{1:t-1}|z_{1:t-1}).$$

The pdf $p(x_t^m|x_{t-1}^m, z_{1:t})$ can be derived according to the Bayesian rule:

$$p(x_t^m \mid x_{t-1}^m, z_{1:t}) =$$
$$\frac{p(z_t \mid x_t^m, x_{t-1}^m) p(x_t^m \mid x_{t-1}^m, z_{t-1}^m)}{p(z_t \mid z_{t-1})} \propto p(z_t \mid x_t^m) p(x_t^m \mid x_{t-1}^m).$$

Therefore, the Bayesian Rule implies the following expression for the weights:

$$w_t^m \propto w_{t-1}^m \frac{p(z_t \mid x_t^m) p(x_t^m \mid x_{t-1}^m)}{q(x_t^m \mid x_{t-1}^m, z_t)}$$

The Importance Density $q(x_t \mid x_{1:t}^m, z_t)$ is chosen to be equal to $p(x_t^m \mid x_{t-1}^m)$, which reduces the conditional probability to $$w_t^m \propto w_{t-1}^m p(z_t \mid x_t^m). \quad (1)$$

Once a set of samples has been drawn, $p(z_t \mid x_t^m)$ can be computed out of the observation $z_t$ given each sample, and the estimation of the posteriori pdf can be sequentially updated.

The state of the vessel can be defined at a given time as follows:

$$\underbrace{x = (x_1, x_2, x_3)}_{\text{position}}, \underbrace{\Theta = (\theta_1, \theta_2, \theta_3)}_{\text{orientation}}, \underbrace{\varepsilon = (\alpha, \beta, \phi)}_{\text{cross-section}},$$

where the vessel state vector consists of the 3D location of the vessel position x, the tangent vector Θ, and an ellipse ε (a (α(major axis radius), β (minor axis radius), φ (orientation)) that models the vessel shape on a cross-section.

Once the feature space is built, the next issue to be addressed is the definition of a measure of fitness between the particle hypothesis and the actual observation: the conditional probability $p(z_t \mid x_t^m)$ in EQ. (1). Image terms can be used for this, in particular the intensities that correspond to the vessel in the current cross section.

Each hypothesis is composed by the features given in the vessel state vector, therefore, the probability measure is essentially the likelihood of the observation z, conditional to the location x, tangent vector Θ and shape ε:

$$p(z \mid x, \Theta, \varepsilon) = p(z \mid \varepsilon) \times p(z \mid x, \Theta)$$

assuming statistical independence of shape and appearance. This independence is achieved through the shape normalization which is performed during the prior learning.

The conditional probability of EQ. (1) can be designed using prior knowledge about the feature space, i.e. vessel shape and appearance. Medical imaging is a domain where prior knowledge if often available both in the appearance and the structure space. Such knowledge can either be induced from the known anatomy of the human organs or constructed from a training set of structures that describe the same organ. Such a ground truth is often provided by clinicians.

Modeling variation by statistical means implies recovering a distribution that describes the training set. In the case of vessel segmentation, a manual delineation can be considered to be available and a centerline has been extracted. Let $N_1, N_2, \ldots, N_\tau$ be the set of vessel cross sections, starting from a random position, in a discrete form. One can consider the appearance of the vessels as a set of 2D images $$I(N_1), I(N_2), \ldots, I(N_\tau),$$

that need to be normalized in space and appearance. Regarding appearance, a linear transformation can be used that maps the actual values to a fixed interval [0, 1]. On the other hand, given the elliptic form of the vessel, one can use a spherical disk to be the common pose of all vessels, and then use an isoperimetric sampling rule within this disk, leading to a set of normalized vessel spherical profiles in space and appearance:

$$I'(N_1), I'(N_2), \ldots, I'(N_\tau).$$

Modeling variations comprises (1) selecting the nature of the density function, and (2) recovering the parameters of such a function so it approximates the registered data. Parametric linear models, such as Gaussian densities, are often employed through either an Expectation-Maximization algorithm or a singular value decomposition. One can claim that such models refer to an efficient compact approximation when the selected model fits the data.

Let $I'(N_i)$ be a column vector representation of the previous τ observations and assume that the dimensionality of this vector is d. One can estimate the mean vector $\bar{I} = M$ and subtract it from the input to obtain zero mean vectors $\{\tilde{I}(t)\}$. Given the set of training examples and the mean vector, one can define the d×d covariance matrix as:

$$\Sigma_{\tilde{I}} = E\{\tilde{I}(t) \tilde{I}^T(t)\}.$$

It is well known that the principal orthogonal directions of maximum variation for $\tilde{I}(t)$ are the eigenvectors of $\Sigma_{\tilde{I}}$. Approximating the covariance matrix with the sample covariance matrix $\tilde{I}_T \tilde{I}_T^T$, where $\tilde{I}_T$ is the matrix formed by concatenating the set of images $\{\tilde{I}(t)\}_{t=1,\ldots,\tau}$, one can compute such eigenvectors using the singular value decomposition of $$\tilde{I}_T \tilde{I}_T^T = UDV^T.$$

The basis vectors and the corresponding variance in the direction of such basis vectors can be obtained from the matrices U and D respectively. The variance information can further be used to determine the number n of basis vectors required to retain a certain percentage of the variance in the data, leading to the following expression:

$$I = M + \sum_{k=1}^{m} b_k U_k.$$

Figure 2:
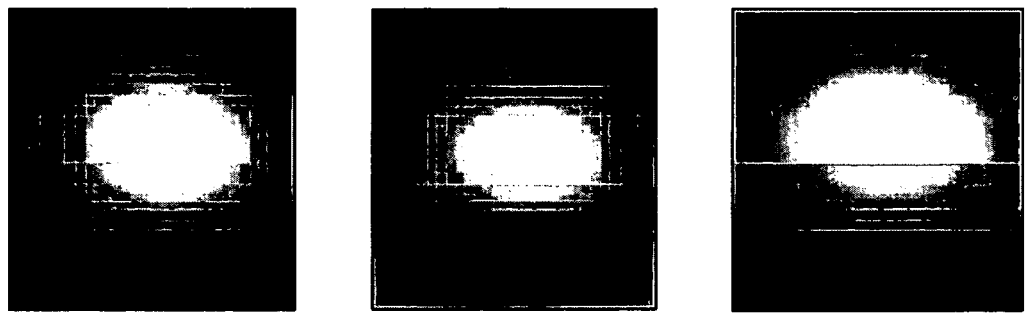
FIG. 2 depicts an illustrative mean cross-section and two variation modes, according to an embodiment of the invention.
Figure 3:
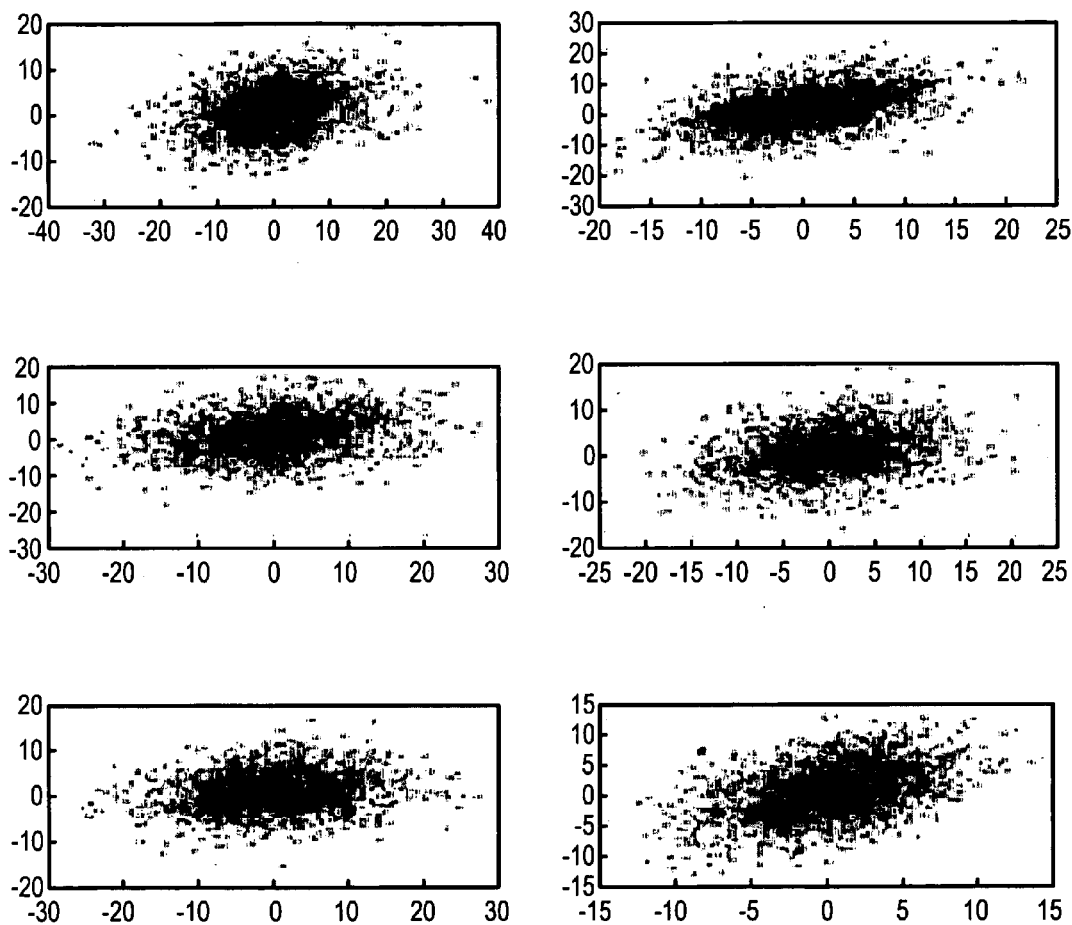
FIG. 3 depicts vessel profiles and non-vessel profiles projected onto the variation modes, according to an embodiment of the invention.

In the present case, the set of n modes needed to represent 95% of total variation is retained. Examples of the retained eigenvectors are shown in FIG. 2, in which the mean cross section is depicted in the left panel, and the two main variation modes are depicted in the middle and right panels, respectively. FIG. 3 depicts the vectors projected onto the variation mode eigenvectors. The vessel profiles are the dark spots in the center, and non-vessel profiles are the surrounding gray regions. The profiles that are kept are those whose variations $b_x$ are bounded by $m\sqrt{\lambda_k}$ along each variation mode $U_k$ where $\lambda_k$ is the eigenvalue corresponding to the eigenvector $U_k$.

Then, the distance D(S, M) between a given normalized profile in appearance and scale S and the model M is scaled down according to the eigenvalue along each variation mode:

$$D(S, M) = \sum_k \frac{|b_k|}{\sqrt{\lambda_k}}.$$

Experimental validation has demonstrated the validity of the Gaussian assumption on the vessel appearance. The Mahalanobis distance distribution for vessels that do not belong to the training set is almost identical to the one computed on vessels that are part of the training set. On the other hand, a clear distinction is possible between the non vessel and the vessel profiles.

The probability measure for appearance $p(z \mid x, \Theta)$, above, is based on the distance D:

$$p(z|x,\Theta)=\exp(-D/D_0).$$

The constant $D_0$ is an application specific normalizing constant that will depend on the units used to measure D. The vessel cross section is modeled by an ellipse $\epsilon$, for which a ribbon measure R is computed:

$$\begin{cases} R = -\infty, & \mu_{int} \leq \mu_{ext}, \\ R = \dfrac{\mu_{int} - \mu_{ext}}{\mu_{int} + \mu_{ext}}, & \text{otherwise,} \end{cases}$$

while the correctness of the prediction is given by:

$$p(z|\epsilon)=\exp(R/R_0),$$

where $\mu_{int}$ is the mean intensity value for the voxels in the ellipse, and $\mu_{ext}$ is the mean intensity value for the voxels in the ribbon around the ellipse, such that the ribbon and the ellipse have the same area. Similar to the case of $D_0$, the constant $R_0$ is an application specific normalizing constant that will depend on the units used to measure R.

Since the coronary arteries are brighter than the background, the ellipse that best matches the vessel's cross section maximizes R.

Note that for these measures to be considered as probability measures, the sum of all weights should be normalized to one. Therefore, after all the weights are computed in EQ. (1), they are normalized so that they sum up to one.

The combination of edge-driven and region-based metrics measures the fitness of the observation to the prior knowledge included in the state vector. It is also more robust than a simple image term since it relies on a statistical model.

Furthermore, after few time steps, EQ. (1) leads to a degeneracy issue arises: most particles have almost zero weight. To circumvent this, a resampling procedure is used to regroup most of the particles in the feature space region where the highest probabilities are concentrated.

According to an embodiment of the invention, a Systematic Importance Resampling algorithm is used, which draws new samples from the posterior pdf $p(x_t|x_{t-1}^m)$. This resampling method is easy to implement, and is sufficiently unrestrictive to allow particles to diverge into small branches. A measure of sampling degeneracy is the Effective Sampling Size $N_{\mathit{eff}}$:

$$N_{\mathit{eff}} = \frac{1}{\Sigma_m w_m^2}.$$

In practice, when $N_{\mathit{eff}}$ falls below half the number of particles, a resampling is performed from the posterior pdf $p(x_t|z_t)$.

During the resampling step, the random vector that is added to the selected samples follows a predetermined pdf. A straightforward method according to an embodiment of the invention would be to learn the law of variation of the particles features, and use this law to drive the random vector toward the most probable states, given the results obtained from ground-truth.

The ellipse $\epsilon$ varies according to a law that is learned from ground truth. Unlike vessel tangent direction, changes in radius do not happen as suddenly; therefore, the variation law (a zero-mean Gaussian) is used for resampling.

The particle angle with the tangent vector is statistically a zero-mean Gaussian. If a zero-mean Gaussian were to be used during the diffusion step, very few particles would be oriented with a high angle. Consequently, in the event of a branching with high angle, almost no particle would be correctly oriented. This result is referred to as sample impoverishment, a situation where most of the particles are concentrated into one single region of the feature space and may miss other regions, which would mean a branching in the current application. This can be overcome by incorporating prior knowledge into the resampling step.

It is possible to classify branchings in two main categories: balanced branchings, with two daughter branches oriented at 45 degrees, and unbalanced branchings, with one branch that is significantly narrower than the other, with a higher angle. A law of variation is then designed as the weighted sum of three Gaussians: a zero-mean Gaussian (probability 0.8), and two others, one with a mean of 45 degrees (probability 0.15), and the other one with a higher mean (60 degrees with probability 0.05).

This technique reduces the number of particles necessary to achieve the same segmentation results. The number of particles used for complete segmentation on a test bed of 34 patients decreases from 1,000 for uniform resampling to 500. This circumvents sample impoverishment, counterbalancing the particles collapsing into a specific feature space region by adding some controlled process noise, motivated by a prior model.

Figure 4:
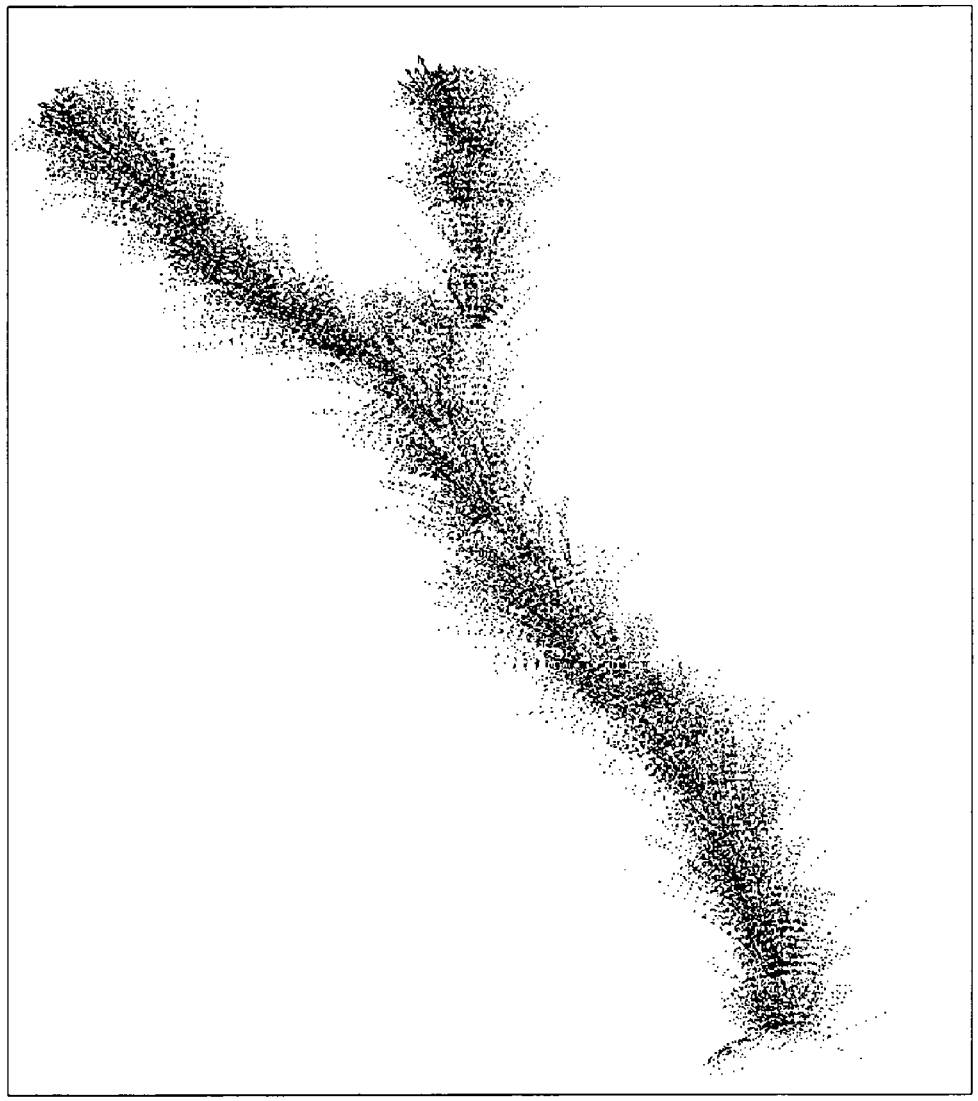
FIG. 4 depicts branching points between LCX and LAD for three patients with the particles clustered using K-means following the two branches, according to an embodiment of the invention.

Another issue to be addressed is branching detection. Particle Filters behave poorly in multiple modes context. Very often, one of the modes attracts most of the particles, and few resampling steps later, the other modes collapse. In the case of vascular segmentation, modes represent branches. In order for all modes/branches to survive, branchings are detected, and a new Particle Filter is started for each branch independently. The detection is performed using a clustering algorithm, such as a K-means algorithm, in the particles position-orientation space. Note that the K-means algorithm is exemplary, and any clustering algorithm can be used to detect the branch. FIG. 4 depicts branching points between LCX and LAD for one patient with the particles clustered using K-means following the two branches.

Figure 7:
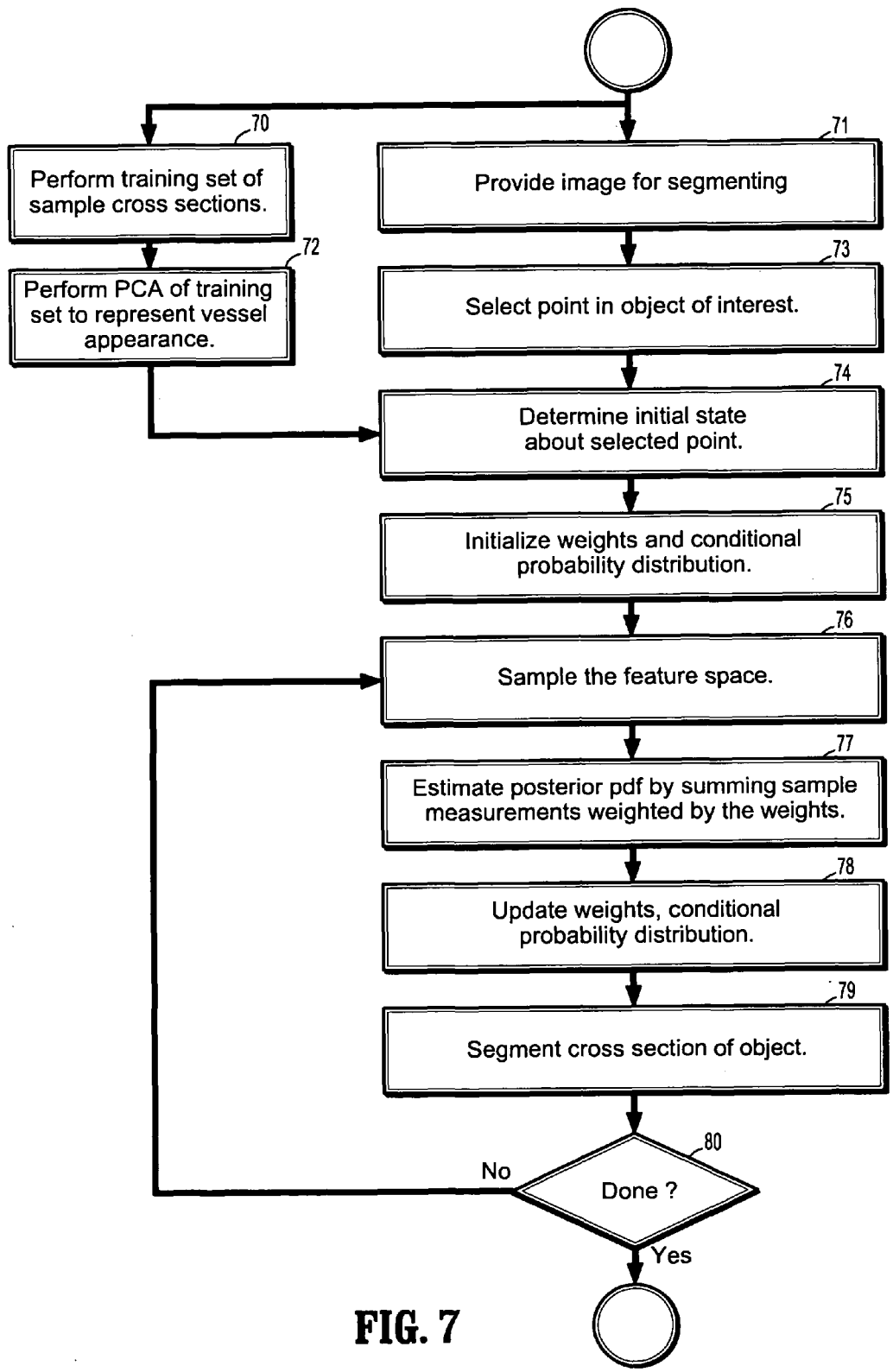
FIG. 7 is a flow chart of a particle-filter based segmentation method according to an embodiment of the invention.

A flow chart of a Particle Filter based vascular segmentation method according to an embodiment of the invention is shown in FIG. 7. An image for segmenting is provided at step 71. A exemplary image would typically comprise a 3D grid of points acquired by any imaging modality as is known in the art, with either a scalar intensity or a vector value associated with each point. A point is selected in an object of interest at step 73. In exemplary embodiment, the point can be selected by a use viewing the image on a display of a computer workstation using an input device such as a mouse or other pointer. Separately from acquiring the image and selecting an initial point, a training set of vessel cross sections of exemplary vascular structures, obtained from previously acquired images, is provided at step 70, and a principle component analysis (PCA) is performed at step 72 to determine a set of basis eigenvectors that can represent an exemplary vessel appearance, as described above. At step 74, this vessel appearance is used to determine an initial state, including the vessel center position, orientation, and cross sectional model, about the selected point. The conditional probability distribution and measurement weights are initialized from the initial state at step 75. As discussed above, the vessel shape and appearance can be assumed to be statistically independent, so the conditional probability distribution can be represented as a product of the position/orientation distribution, and the shape-model distribution. At step 76, the feature space is sampled. The measurements corresponding to these samples are summed at step 77, weighted by the measurement weights, to estimate the posterior probability distribution function. At step 78, the weights and conditional probability distributions are updated. The posterior probability distribution is a probability of the features that describe the object. These features include the object's location, orientation and appearance along the object centerline. This posterior probability distribution is used at step 79 to segment a cross section of the object. The segmentation can be performed by any suitable technique, such as a maximum likelihood method, or a weighted average method. If, at step 80, the segmentation is complete, the process terminates, otherwise it returns to step 76 for another sampling of the feature space, and steps 77, 78, and 79 are repeated.

Figure 6A:
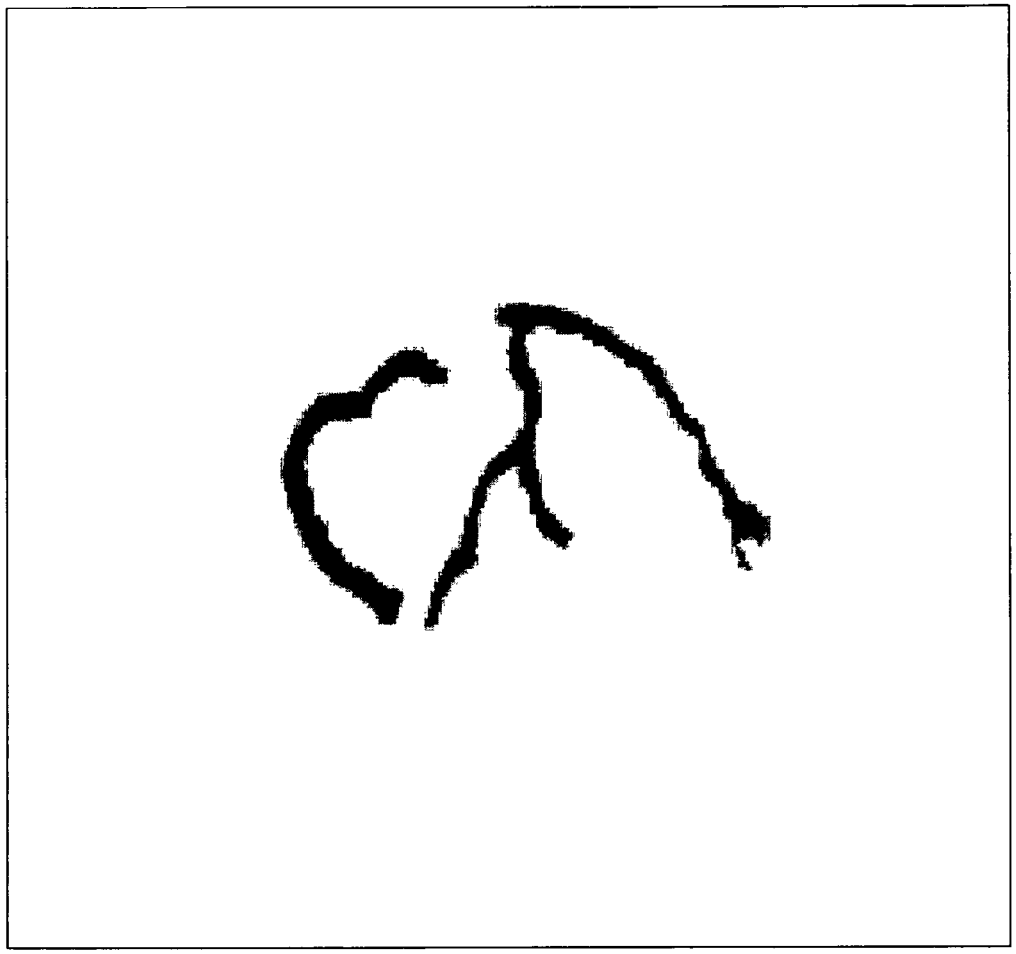
FIGS. 6(a)-(b) depict results for the segmentation of the left anterior descending coronary artery in CTA, according to an embodiment of the invention.
Figure 6B:
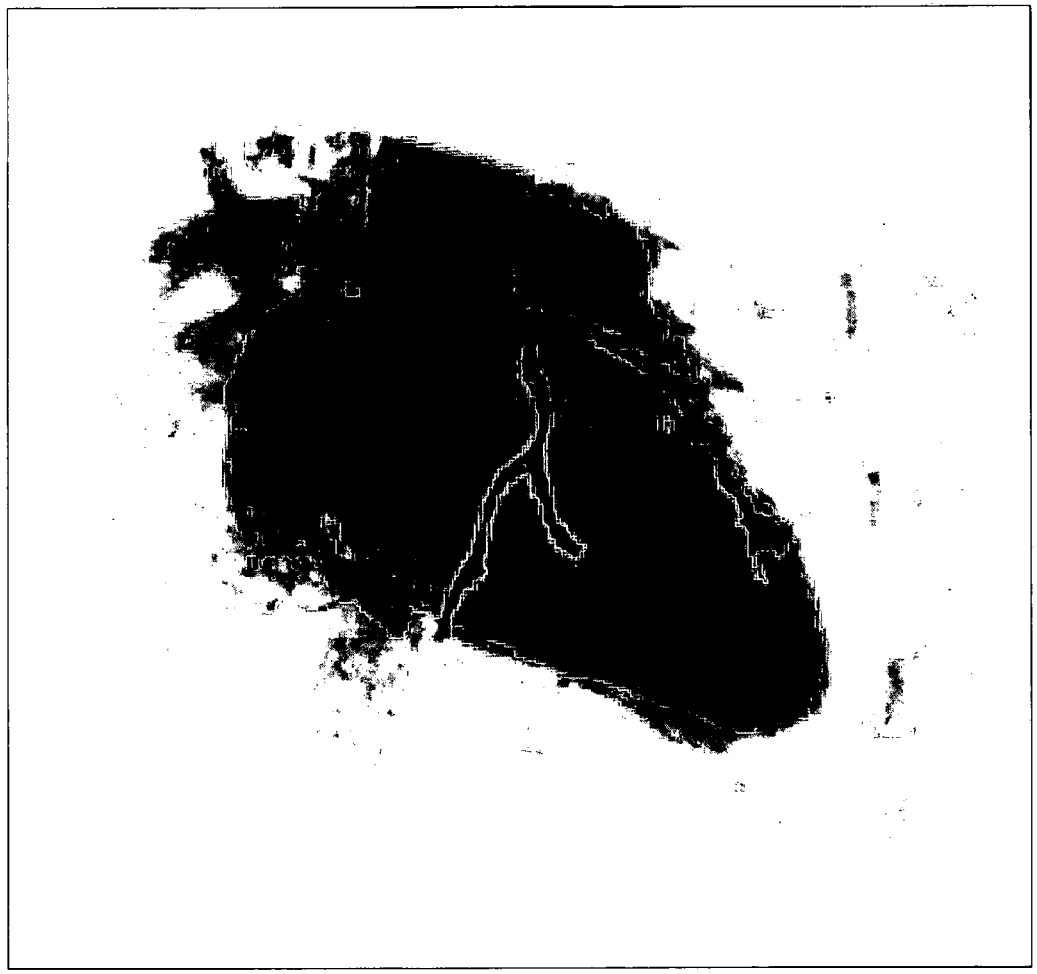

Experiments of method according to embodiments of the invention were conducted on several healthy and diseased patients CTA data sets, segmenting the Left Main Coronary Artery and the Right Coronary Artery. FIGS. 6(*a*)-(*b*) depict results for the segmentation of the left anterior descending coronary artery in CTA. FIG. 6(*a*) depicts the coronary tree, while FIG. 6(*b*) depicts a 3D views super-imposed to the cardiac volume. Validation is a difficult part for any coronary segmentation method. An algorithm according to an embodiment of the invention has been evaluated on 37 patients, and has successfully recovered all the main arteries (RCA, LAD, LCX) for each patient as shown in the table of FIG. 5, while a small portion of visual results are also presented in FIG. 6.

These results were achieved with a one-click initialization. A method based on a principle component analysis of the intensity volume provides the approximate initial direction. All patients presented some kind of artery pathologies in one, at least, of their coronary vessels. This means the Particle Filter successfully segmented both healthy and unhealthy coronaries.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
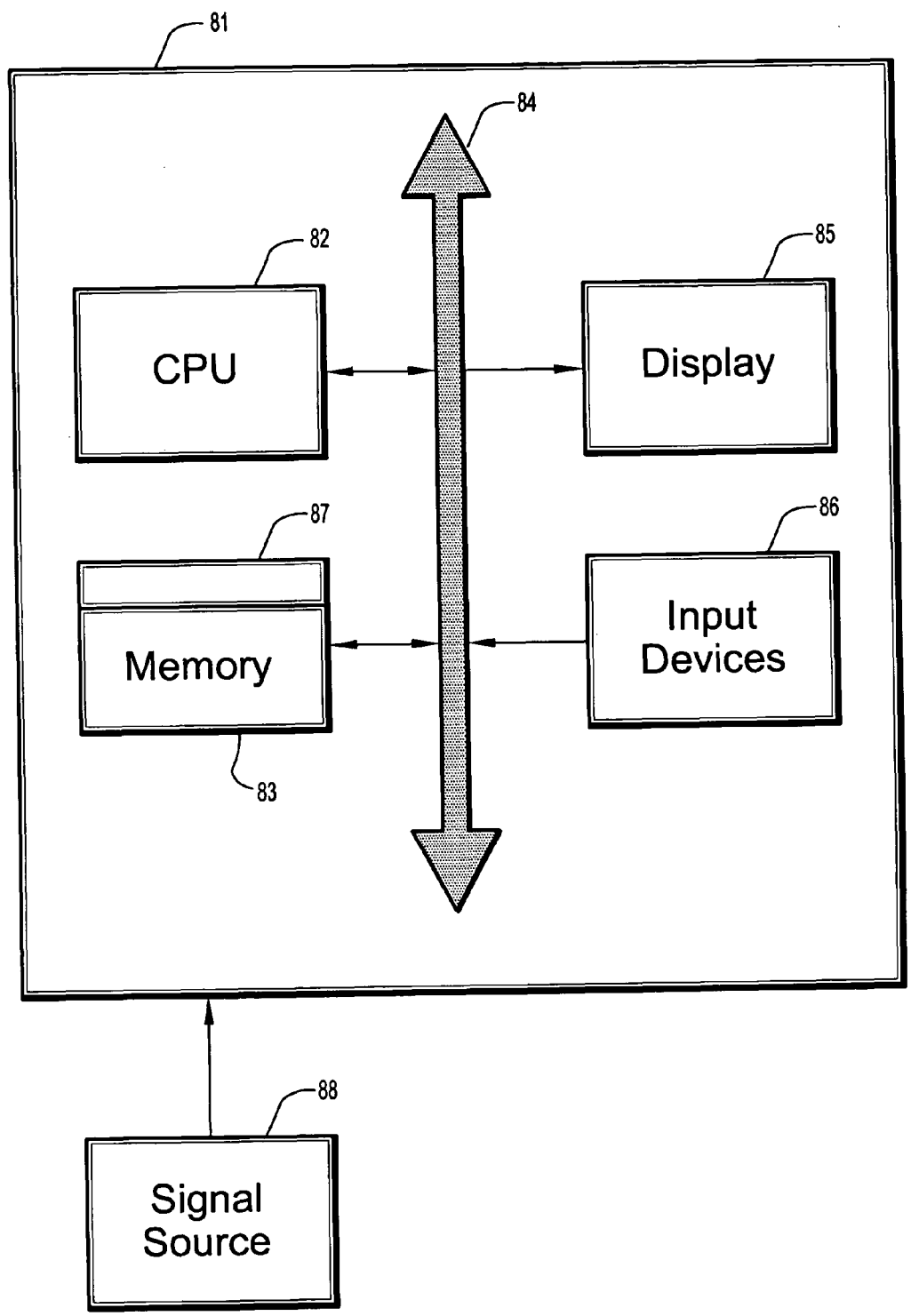
FIG. 8 is a block diagram of an exemplary computer system for implementing a particle-filter based segmentation method according to an embodiment of the invention.

FIG. 8 is a block diagram of an exemplary computer system for implementing a particle filter based vascular segmentation according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 32 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method of segmenting tubular structures in digital images, comprising the steps of:

providing a digitized image comprising a plurality of intensities corresponding to a domain of points on a 3-dimensional grid;

selecting a point within a tubular object in said digitized image, wherein said tubular object is to be segmented;

defining an initial state of said selected point of said tubular object as comprising an object center position, an object orientation, and an object cross section model modeled by an ellipse;

initializing measurement weights, a conditional probability distribution and a prior probability distribution of a feature space of said initial state, wherein said initial conditional probability of said object cross section is proportional to $\exp(-R/R_0)$, where R is a ribbon measure defined by $$\begin{cases} R = -\infty, & \mu_{int} \leq \mu_{ext}, \\ R = \dfrac{\mu_{int} - \mu_{ext}}{\mu_{int} + \mu_{ext}}, & \text{otherwise,} \end{cases}$$

wherein $R_0$ is an application specific normalization constant, $\mu_{int}$ is the mean intensity value for points in the ellipse, and $\mu_{ext}$ is the mean intensity value for points in a ribbon around the ellipse, wherein the ribbon and the ellipse have the same area;

sampling said feature space from said prior probability distribution;

estimating a posterior probability distribution by summing sample measurements weighted by said measurement weights, and segmenting a cross section of said tubular object from said posterior probability distribution.

2. The method of claim 1, further comprising providing a training set of tubular cross sections, and performing a principle component analysis on the cross sections of said training set to determine a representation of said tubular cross section.

3. The method of claim 1, wherein estimating said posterior probability distribution $P(x_t|z_{1:t})$ comprises computing $$p(x_t \mid z_{1:t}) \approx \sum_{m=1}^{M} w_t^m \delta(x_t - x_t^m),$$

wherein M is the number of samples, $w_t^m$ represents the weight for each sample at time step t, $x_t^m$ represents the sample measurements at time t, and $\delta$ is the Dirac delta function.

4. The method of claim 1, further comprising updating said measurement weights, wherein $w_t^m \propto w_{t-1}^m (z_t \mid x_t^m)$, $w_t^m$ represents the weight for each sample at time step t, $z_t$ represents an observation of said state at time t, $x_t^m$ represents the sample measurements at time t, and $p(z_t \mid x_t^m)$ is the conditional probability.

5. The method of claim 2, wherein said training set comprises a set of 2D cross sectional images, and performing a principle component analysis on said training set cross sections comprises estimating a mean of said training set and subtracting said mean to obtain a set of zero-mean cross sectional images, forming a covariance matrix from said set of zero-mean cross sectional images, performing a singular value decomposition $UDV^T$ of said covariance matrix, wherein a model zero-mean cross section is obtained summing those eigenmodes representing a predetermined percentage of the variation in said set of cross sections.

6. The method of claim 5, wherein a conditional probability distribution for appearance is proportional to $\exp(-D/D_0)$, wherein D is a distance between said model cross section and a normalized sample cross section that comprises $$\sum_k \frac{|b_k|}{\sqrt{\lambda_k}},$$

$D_0$ is an application specific normalization constant, k is summed over representative eigenmodes, $b_k$ is the variation for each mode, and $\lambda_k$ is the eigenvalue for each eigenmode.

7. The method of claim 1, further comprising resampling said feature space from said posterior probability distribution by adding a random vector to samples selected from the most probable portions of said probability distribution.

8. The method of claim 7, wherein said resampling is performed when an effective sampling size $$N_{\mathit{eff}} = \frac{1}{\Sigma_m w_m^2}$$

is less than half of the number of samples, wherein $w_m$ represents the weight for each sample.

9. The method of claim 1, further comprising using clustering algorithm to detect a branch in said object.

10. A program storage device readable by a computer, tangibly embodying a program of instructions executable by the computer to perform the method steps for segmenting tubular structures in digital images, comprising the steps of:
providing a digitized image comprising a plurality of intensities corresponding to a domain of points on a 3-dimensional grid;
selecting a point within a tubular object in said digitized image, wherein said tubular object is to be segmented;
defining an initial state of said selected point of said tubular object as comprising an object center position, an object orientation, and an object cross section model modeled by an ellipse;
initializing measurement weights, a conditional probability distribution and a prior probability distribution of a feature space of said initial state, wherein said initial conditional probability of said object cross section is proportional to $\exp(-R/R_0)$, where R is a ribbon measure defined by $$\begin{cases} R = -\infty, & \mu_{int} \leq \mu_{ext}, \\ R = \dfrac{\mu_{int} - \mu_{ext}}{\mu_{int} + \mu_{ext}}, & \text{otherwise,} \end{cases}$$

wherein $R_0$ is an application specific normalization constant, $\mu_{int}$ is the mean intensity value for points in the ellipse, and $\mu_{ext}$ is the mean intensity value for points in a ribbon around the ellipse, wherein the ribbon and the ellipse have the same area;
sampling said feature space from said prior probability distribution;
estimating a posterior probability distribution by summing sample measurements weighted by said measurement weights; and
segmenting a cross section of said tubular object from said posterior probability distribution.

11. The computer readable program storage device of claim 10, the method further comprising providing a training set of tubular cross sections, and performing a principle component analysis on the cross sections of said training set to determine a representation of said tubular cross section.

12. The computer readable program storage device of claim 10, wherein estimating said posterior probability distribution $P(x_t \mid z_{1:t})$ comprises computing $$p(x_t \mid z_{1:t}) \approx \sum_{m=1}^{M} w_t^m \delta(x_t - x_t^m),$$

wherein M is the number of samples, $w_t^m$ represents the weight for each sample at time step t, $x_t^m$ represents the sample measurements at time t, and $\delta$ is the Dirac delta function.

13. The computer readable program storage device of claim 10, the method further comprising updating said measurement weights, wherein $w_t^m \propto w_{t-1}^m p(z_t \mid x_t^m)$, $w_t^m$ represents the weight for each sample at time step t, $z_t$ represents an observation of said state at time t, $x_t^m$ represents the sample measurements at time t, and $p(z_t \mid x_t^m)$ is the conditional probability.

14. The computer readable program storage device of claim 11, wherein said training set comprises a set of 2D cross sectional images, and performing a principle component analysis on said training set cross sections comprises estimating a mean of said training set and subtracting said mean to obtain a set of zero-mean cross sectional images, forming a covariance matrix from said set of zero-mean cross sectional images, performing a singular value decomposition $UDV^T$ of said covariance matrix, wherein a model zero-mean cross section is obtained summing those eigenmodes representing a predetermined percentage of the variation in said set of cross sections.

15. The computer readable program storage device of claim 14, wherein a conditional probability distribution for appearance is proportional to $\exp(-D/D_0)$, wherein D is a distance between said model cross section and a normalized sample cross section that comprises $$\sum_k \frac{|b_k|}{\sqrt{\lambda_k}},$$

$D_0$ is an application specific normalization constant, k is summed over representative eigenmodes, $b_k$ is the variation for each mode, and $\lambda_k$ is the eigenvalue for each eigenmode.

16. The computer readable program storage device of claim 10, the method further comprising resampling said feature space from said posterior probability distribution by adding a random vector to samples selected from the most probable portions of said probability distribution.

17. The computer readable program storage device of claim 16, wherein said resampling is performed when an effective sampling size $$N_{\text{eff}} = \frac{1}{\Sigma_m w_m^2}$$

is less than half of the number of samples, wherein $w_m$ represents the weight for each sample.

18. The computer readable program storage device of claim 10, the method further comprising using clustering algorithm to detect a branch in said object.

19. A method of segmenting tubular structures in digital images, comprising the steps of:
  selecting a tubular object in a digital image;
  initializing a plurality of measurement weights, a conditional probability distribution and a prior probability distribution of features that characterize said tubular object, said features including an object center position, an object orientation, and an object cross section model, wherein said initial conditional probability of said object cross section is proportional to $\exp(-R/R_0)$, where R is a ribbon measure defined by $$\begin{cases} R = -\infty, & \mu_{int} \le \mu_{ext}, \\ R = \dfrac{\mu_{int} - \mu_{ext}}{\mu_{int} + \mu_{ext}}, & \text{otherwise,} \end{cases}$$

wherein $R_0$ is an application specific normalization constant, $\mu_{int}$ is the mean intensity value for points in the ellipse, and $\mu_{ext}$ is the mean intensity value for points in a ribbon around the ellipse, wherein the ribbon and the ellipse have the same area;
  estimating a posterior probability distribution by summing sample measurements of said features weighted by said measurement weights;
  updating said measurement weights from said conditional probability distribution; and
  segmenting a cross section of said tubular object from said posterior probability distribution.

20. The method of claim 19, wherein said digitized image comprises a plurality of intensities corresponding to a domain of points on a 3-dimensional grid.

21. The method of claim 19, wherein said feature sample measurements are determined by sampling said prior probability distribution.

22. The method of claim 19, wherein said tubular object is selected by selecting a point in said image that is within said object.

23. The method of claim 19, further comprising repeating the steps of estimating a posterior probability distribution, updating said measurement weights, and segmenting a cross section of said tubular object until said tubular object has been completely segmented.

* * * * *